US008797223B2

(12) United States Patent
Raguenet et al.

(10) Patent No.: US 8,797,223 B2
(45) Date of Patent: Aug. 5, 2014

(54) ANTENNA SYSTEM WITH TWO GRIDS OF SPOTS WITH NESTED COMPLEMENTARY MESHES

(75) Inventors: Gérard Raguenet, Eaunes (FR);
Thierry Youssefi, Labastidette (FR);
Michel Salomon, Toulouse (FR);
Etienne Barritault, Toulouse (FR);
Didier Le Boulch, Castelginest (FR)

(73) Assignee: Thales, Neuilly sur Seine (FR)

( * ) Notice: Subject to any disclaimer, the term of this patent is extended or adjusted under 35 U.S.C. 154(b) by 292 days.

(21) Appl. No.: 13/244,022

(22) Filed: Sep. 23, 2011

(65) Prior Publication Data
US 2012/0075150 A1   Mar. 29, 2012

(30) Foreign Application Priority Data
Sep. 24, 2010   (FR) .................................... 10 03789

(51) Int. Cl.
*H01Q 13/00*   (2006.01)
(52) U.S. Cl.
USPC ......... 343/781 P; 343/766; 455/427; 455/429
(58) Field of Classification Search
USPC ................ 343/893, 781 P, 781 CA, 766, 711; 455/427, 429
See application file for complete search history.

(56) References Cited

U.S. PATENT DOCUMENTS 5,115,248 A   5/1992   Roederer

FOREIGN PATENT DOCUMENTS

| EP | 0420739 A1 | 4/1991 |
| EP | 1126543 A2 | 8/2001 |
| FR | 2854737 A1 | 11/2004 |
| GB | 2262387 A1 | 6/1993 |
| WO | 99/35766 A1 | 7/1999 |

*Primary Examiner* — Dieu H Duong
(74) *Attorney, Agent, or Firm* — Baker Hostetler LLP (57) ABSTRACT

An antenna system is able to cover a geographical zone with two grids of spots with nested meshes, shifted one with respect to the other. The multi-beam system covers a geographical zone decomposed into a plurality of spots, the antennas each comprising an array of radiating elements able to receive and/or to transmit radioelectric signals, and being configured so as to cover, in reception and/or in transmission, the zone with two grids of spots, several spots of the first grid, generated by a first antenna, being positioned according to a first geometric pattern, so that points are situated substantially equidistantly from several adjacent spots, several spots of the second grid, that are generated by a second antenna, being positioned according to a second geometric pattern chosen as a function of the first geometric pattern, such that several spots of the second grid are centered on the points.

13 Claims, 11 Drawing Sheets

FIG.1

PRIOR ART

ANTENNA SYSTEM WITH TWO GRIDS OF SPOTS WITH NESTED COMPLEMENTARY MESHES

CROSS-REFERENCE TO RELATED APPLICATION

This application claims priority to foreign French patent application No. FR 1003789, filed on Sep. 24, 2010, the disclosure of which is incorporated by reference in its entirety.

FIELD OF THE INVENTION

The present invention relates to an antenna system able to cover a geographical zone with two grids of spots having nested meshes, and shifted one with respect to the other so as to complement one another. It applies notably to multi-beam telecommunications satellites, in particular to those required to produce a large number of beams to cover a given territory.

BACKGROUND

The need to reduce data transmission costs necessitates increased satellite capacity. By the same token, increased user throughput to serve applications of multimedia type entails ever greater consumption of bandwidth.

Advances in satellite communication systems have responded to some of these requirements by offering high-throughput services, notably for Internet-related applications. These systems generally produce several tens of beams to cover wide geographical zones of interest, such as continents. Henceforth, new satellite systems are being designed to offer capacities for throughputs of greater than 100 Gb/s, therefore with a higher number of beams, more than one hundred for example. A consequence of these new systems with a large number of beams is that the service zones are sampled with smaller elementary spots and that ever larger antennas, as regards reflector size, are required on the satellite. Thus, for satellites developed with a short-term horizon, and operating in the 20-GHz frequency band, the reflectors have sizes of between 1.7 m to 2.6 m; for medium-term needs, the anticipated sizes lie between 3 m and 4 m, while the reflectors to be developed for long-term needs should exceed 5 m in diameter.

Furthermore, antenna systems are constructed according to an architecture of "one feed, one beam" type, stated otherwise an architecture associating a spot with a source (a source also being describable by the term radiating element), which makes it possible to configure the payload of a satellite in a fairly simple manner. A significant parameter in the design of the antenna system is that of the size of the sources employed. Conventionally, the latter are dimensioned in such a way as to obtain satisfactory antenna efficiency. Hence, the sources are generally dimensioned so that the illumination on the edges of the reflector lies between −7 dB and −15 dB with respect to the illumination at the centre of the reflector. The sources are thereafter installed in the focal plane side by side. With this configuration, a first source alongside a second source will generate a spot that is distant from the spot generated by the second source, so that the beams of a single antenna will illuminate the geographical zone only in a discontinuous manner. A second antenna is therefore necessary in order to plug the hole on an axis, and a third or indeed a fourth antenna depending on the mesh in order to fully complete the coverage with a set of beams ensuring the links with the EIRP ("Equivalent Isotropic Radiated Power") and G/T levels required for the service quality envisaged.

Thus, having regard to these constraints, a conventional architecture relies on four antennas each operating in transmit/receive (RX/TX) mode. Indeed, having regard to the limited space on craft launchers, an architecture with eight antennas comprising four antennas in transmit mode (TX) and four antennas in receive mode (RX) would be very difficult to implement.

Figure 1:
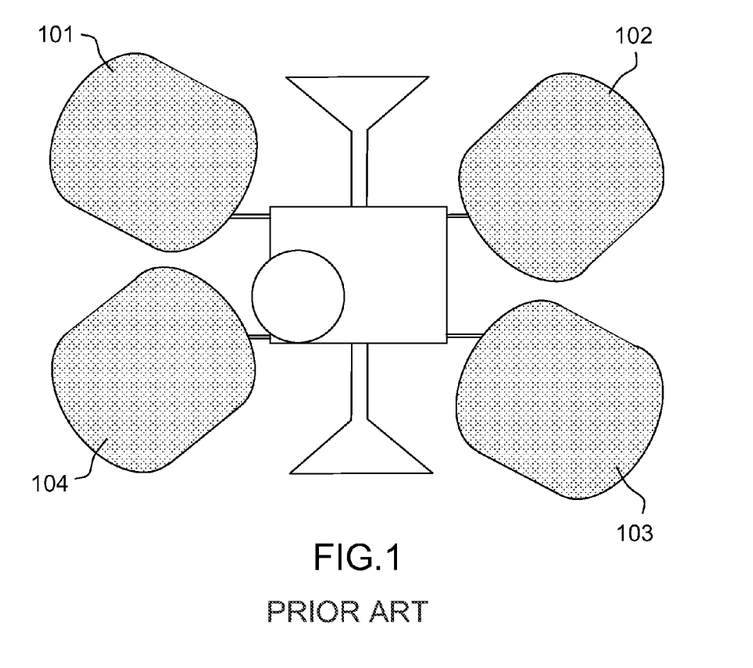
FIG. 1, a diagram representing an antenna system according to the prior art comprising four reflectors able to operate in transmission and in reception; this figure has already been presented above.

This manner of operation in mixed RX/TX mode with four antennas comprises several drawbacks. Firstly, the antenna system is forced to operate on separated and widened bands. For example, in the Ka-band, transmission is performed in the 20-GHz band and reception is performed in the 30-GHz band. The antenna must offer a compromise as regards a set of parameters such as size of the spots, the spatial selectivity of the spots (stated otherwise, the roll-off), the C/I level over 150% of the bandwidth, the ratio C/I being the ratio of the useful signal C to the interfering signals I arising from the neighbouring spots. Moreover, this architecture employs complex primary source blocks with broadband sources as well as complex and expensive frequency and polarization extractors. Furthermore, the filtering between the transmit mode and the receive mode may turn out to be critical if the transmit mode is high power. Finally, installation on a satellite leads to double deployments of the reflectors. The storage constraints for these reflectors give rise to interactions of a mechanical kind with the structures of the launcher so that inevitable truncations at the level of the geometry of the reflectors of greater or smaller amplitude occur, as illustrated in FIG. 1, where the reflectors 101, 102, 103, 104 are truncated on two sides. Consequently, an architecture with four reflectors in RX/TX mode causes a rotation of 90° of the coverages at each antenna hop, substantially elliptical coverages, unacceptable C/I levels because of the upswings in the lateral or side lobes and a reduction in the utilizable area of the reflectors of possibly as much as 1 dB or indeed 1.5 dB as regards the accessible maximum directivity. All these factors reduce the capacity of the antenna system.

SUMMARY OF THE INVENTION

An aim of the invention is to propose a multi-beam antenna system capable of receiving and of transmitting radioelectric signals, whose architecture is of "one feed one beam" type and which makes it possible either to reduce the number of antennas required for the generation of the coverages, or to be able to propose an architecture devoid of the setup problems of the abovementioned configuration with truncated reflectors. For this purpose, the subject of the invention is a multi-beam antenna system for covering a geographical zone decomposed into a plurality of spots, the system comprising two antennas for reception and/or for transmission, wherein the antennas are configured so as to cover the said zone with two grids of spots, several spots of the first grid, that are generated by a first antenna, being positioned according to a first geometric pattern, so that there exist points that are situated substantially equidistantly from several adjacent spots, several spots of the second grid, that are generated by the second antenna, being positioned according to a second geometric pattern chosen as a function of the first geometric pattern, in such a way that several spots of the second grid are centred substantially on the said points.

According to one embodiment of the multi-beam antenna system according to the invention, several spots of the first grid, that are generated by the first antenna, are aligned along two substantially orthogonal axes, so that points exist that are situated substantially equidistantly from the centres of four adjacent spots, several spots of the second grid, that are generated by a second antenna, being centred on the said points. The optimal configuration is obtained by having perfect alignments of the spots, so that the mesh formed by each of the grids is perfectly square. Still correct performance can however be obtained by departing from this optimal case by shifting the spots slightly so that the axes are not perfectly orthogonal.

The spots of the first grid may be substantially the same dimension as the spots of the second grid, the centres of at least two spots of the second grid being, for example, positioned at a distance substantially equal to a spot diameter from the first grid, divided by the square root of two.

According to another embodiment, the spots of the second grid have a radius at least equal to twice the radius of the spots of the first grid, the centres of at least two spots of the second grid being positioned at the level of barycentres of the centres of the spots of the first grid.

According to one embodiment of the multi-beam antenna system according to the invention, several spots of the first grid, that are generated by the first antenna, are aligned along two non-orthogonal axes, so that there exist adjacent spots whose centres form a parallelogram, several spots of the second grid, that are generated by a second antenna, being centred on the centres of the said parallelograms. According to a particular embodiment, the parallelograms are lozenges.

According to one embodiment of the multi-beam antenna system according to the invention, at least one antenna is dimensioned so that a beam is produced by a single radiating element, and for a given reflector size, the size of the radiating elements is chosen less than the optimal size leading to maximum efficiency of the antenna, the said size being chosen so that the losses of energy by spillover of the reflector are greater than those obtained with the said optimal size, the said system comprising at least two adjacent radiating elements, the said size of the element being chosen so that a first radiating element, adjacent to a second radiating element of the said array, can generate a spot adjacent to the spot generated by the second radiating element. This antenna system is said to be in "spillover mode"; it makes it possible to generate continuous grids of spots more easily and thus, to implement a double grid more readily, in particular in the case of a high density of spots.

According to one embodiment of the multi-beam antenna system according to the invention, the size of the sources is such that the level of illumination on the edges of the reflector is in a ratio lying between the values −2 dB and −4 dB with respect to the maximum illumination level obtained on the reflector.

According to one embodiment of the multi-beam antenna system according to the invention, the system comprises two pairs of antennas, the antennas of the said first pair being able to operate in reception only and the antennas of the second pair being able to operate in transmission only, the first antenna of each pair being configured so as to cover the geographical zone according to the first grid of spots, the second antenna of each pair being configured so as to cover the said geographical zone according to the second grid of spots.

The antennas of the first pair may be adapted for operating in a first frequency band, for example a few hundred MHz around 30 GHz, the antennas of the second pair being adapted for operating in a second frequency band distinct from the first band, for example a few hundred MHz around 20 GHz, the reflectors and the sources of the antennas of the second pair being dimensioned substantially in proportion to the frequency ratio of the first frequency band to the second frequency band, in such a way that, for each of the grids of spots, the spots generated by the first antenna are substantially superimposed on those generated by the second antenna.

The aforementioned examples operate in the Ka-band but the invention applies to other frequency bands, for example the Ku and C-bands.

According to another embodiment, the system comprises two antennas each able to operate in reception and in transmission, the first antenna being configured so as to cover the geographical zone according to the first grid of spots, the second antenna being configured so as to cover the geographical zone according to the second grid of spots.

Advantageously, the aperture of the radiating elements may be of square shape, for example horns with square cross-section, the said radiating elements being aligned and placed so that their edges are parallel to one another.

The invention also relates to a satellite comprising an antenna system such as described above.

The invention also relates to a satellite communication system comprising at least two distinct satellites, the first satellite comprising the said first antenna of an antenna system such as described above, a second satellite comprising the said second antenna of the said antenna system.

BRIEF DESCRIPTION OF THE DRAWINGS

Other characteristics will become apparent on reading the following nonlimiting detailed description given by way of example in relation to appended drawings which represent:

FIG. 3b, an example of a second grid of spots complementary to the first grid represented in FIG. 3a;

FIG. 4b, a second example of a second grid of spots complementary to the first grid represented in FIG. 4a;

DETAILED DESCRIPTION

As a preamble, a few terms used hereinafter in the text are defined.

"Antenna" is understood to mean an assembly composed of a main reflector, dimensioned by the person skilled in the art according to criteria relating to the beams to be generated as regards a service coverage and possibly associated with one or more secondary reflectors as well as with a set of sources whose radiation image via the set of the reflector or reflectors generates a grid of beams ensuring all or part of the overlap of the service zone.

"Mesh" is understood to mean a geometric pattern describing the position of the beams of a grid, or more precisely the pattern established by connecting the centres of the spots generated by the beams. The grids of beams have geometries in partially or totally regular. The mesh of the beams associated with a grid fixes the positioning of the sources of the focal array in a physical manner in the construction of the antenna.

Figure 2A:
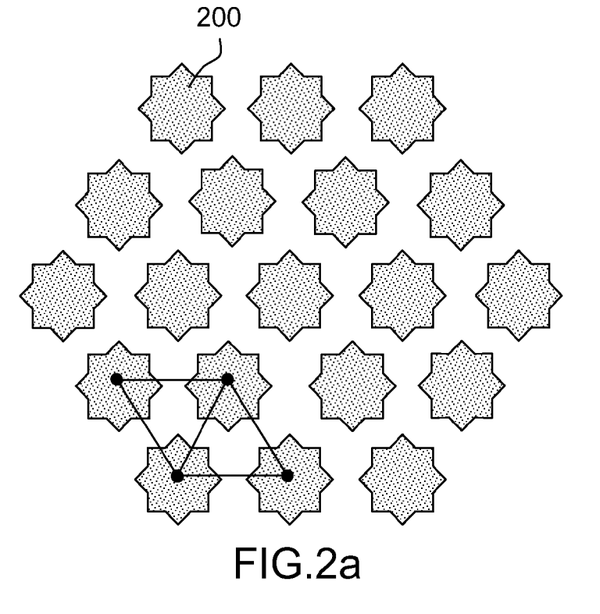
FIGS. 2a, 2b, 2c, examples of meshes used to position the spots of a grid.
Figure 2B:
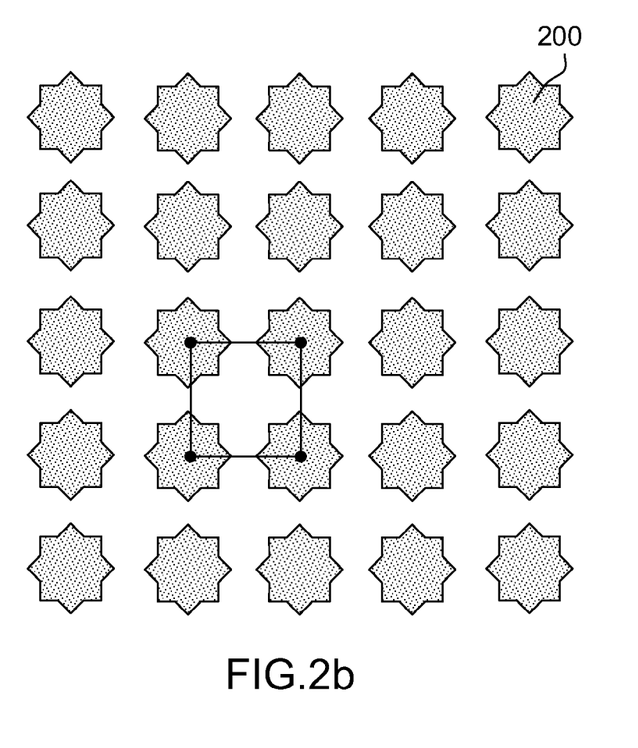
Figure 2C:
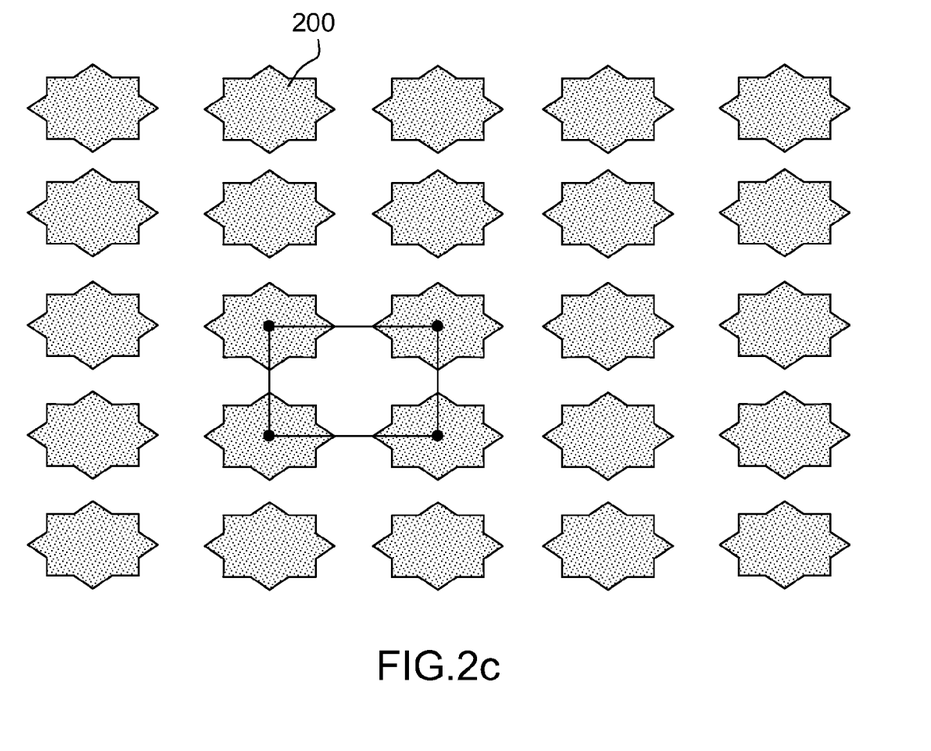

As represented in FIGS. 2a, 2b, 2c, several types of meshes may be used: hexagonal, square, rectangular, circular, or other meshes. In FIGS. 2a, 2b, 2c, the spots 200 are represented by polygons with sixteen sides. FIG. 2a represents an equilateral hexagonal mesh, for which horns with circular or hexagonal aperture may for example be used. FIG. 2b represents a square mesh, for which horns with square or circular aperture, inter alia, may be used. FIG. 2c represents a rectangular mesh, for which horns with pyramidal, square or rectangular aperture may for example be used. It should be noted that not all the sources of the focal array need to comply scrupulously with the regular mesh for a given focal array.

"Complete grid" is understood to mean a grid which ensures the whole of the service coverage. According to the invention, two antennas produce the complete grid. Depending on the type of mesh envisaged for generating the beams, an antenna produces a first grid with beams of a certain size which ensure a partial overlap of the coverage of services. A second grid produced by the second antenna and the size of whose beams may be different from that of the first is positioned superimposed on the first grid so as to produce the complete coverage over the service zone. The second grid is shifted geometrically with respect to the first grid so as to fill in the gaps in performance of the first grid. This shift depends on the nature of the first grid and the second grid is positioned so as to obtain the best performance of the two antennas as a whole.

Figure 3A:
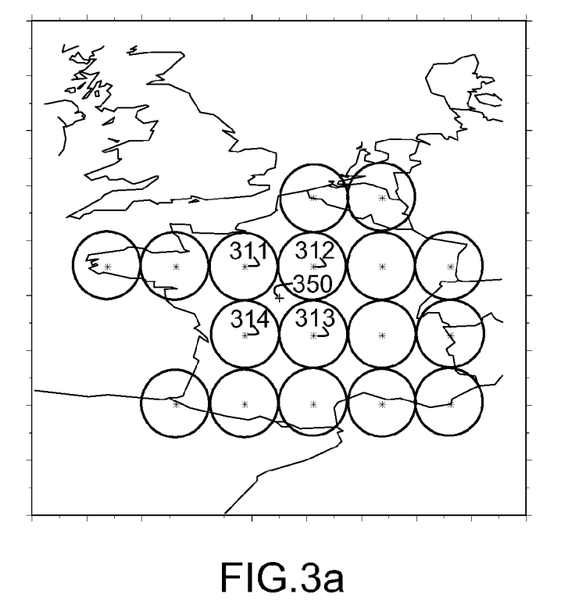
FIG. 3a, an example of a first grid of spots obtained with the system according to the invention.

FIG. 3a presents an example of a first grid of spots obtained with the system according to the invention. The first grid of spots comprises a set of adjacent spots aligned along two orthogonal axes, in such a way that the centres 311, 313, 313, 314 of four adjacent spots form a square, as represented in the figure. Thus, the first grid samples the coverage, in the example the territory of metropolitan France, through spots distributed according to a square mesh the mesh being the geometric pattern connecting the centres of the adjacent spots.

The use of a single grid with square mesh generated with a single antenna, decreases a priori the performance with respect to a grid formed on the model of a conventional triangular mesh, notably because of the fact that the point of minimum directivity is a quadruple point 350, and not a triple point. Also, the roll-off in the direction of the quadruple point does not make it possible to maintain the objectives of capacity or availability to the user. As explained subsequently, this problem can be solved by employing a second grid of spots.

Figure 3B:
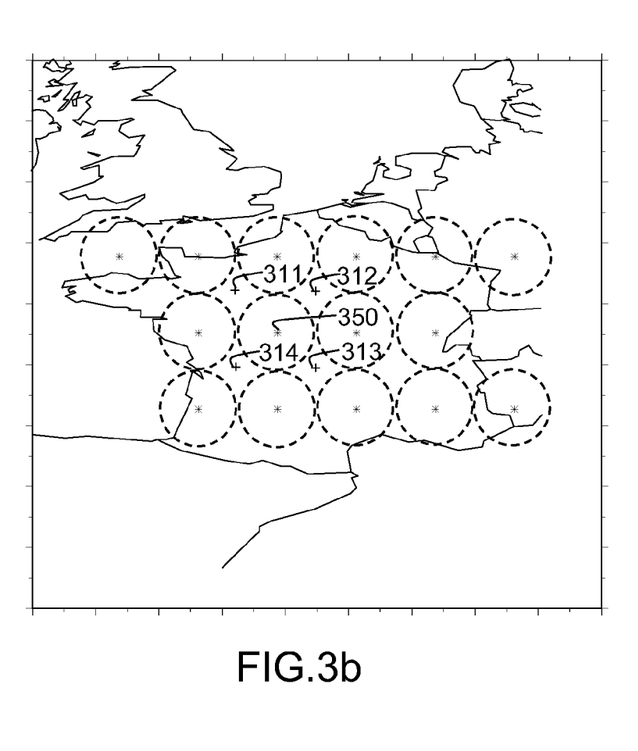

FIG. 3b presents an example of a second grid of spots complementary to the first grid represented in FIG. 3a. The second grid of spots is formed according to a square mesh of the same dimensions as that the first grid (spacings along the two axes), but shifted by half a spot along these same two axes. It therefore comprises a density of spots which is identical to that of the first grid but is shifted with respect to the first grid, so that the centres 350 of the spots belonging to the second grid are situated substantially at the points furthest from the centres 311, 313, 313, 314 of the spots of the first grid, stated otherwise, at the level of the zone of quadruple intersection of four adjacent spots of the first grid.

Figure 3C:
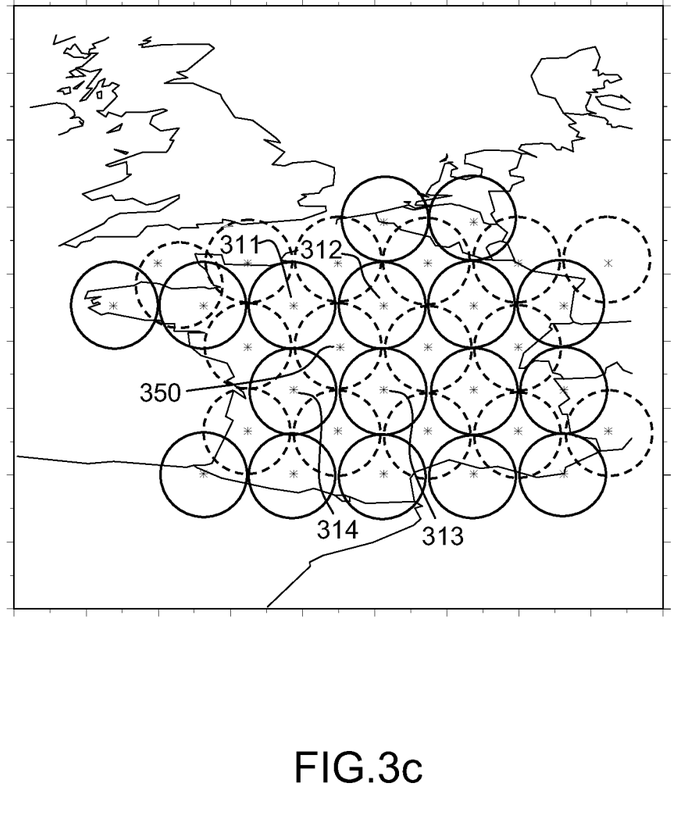
FIG. 3c, an example of a double grid of system spots according to the invention, obtained by combining the first grid of FIG. 3a and the second grid of FIG. 3b.

FIG. 3c presents an example of a double grid of spots, obtained with the system according to the invention by combining the first grid of FIG. 3a and the second grid of FIG. 3b. The two grids of spots are nested, that is to say the spots of the first grid partially overlap the spots of the second grid and the spots of the second grid partially overlap those of the first grid. Furthermore, the second grid is shifted with respect to the first grid along each of the two axes and according to a distance substantially equal to half a spot width. The first grid with square mesh is thus supplemented at the level of its quadruple points by the second grid of like spacing, but shifted so that a point of maximum directivity of one grid is situated at the point of minimum directivity of the other grid.

The rules for dimensioning the architecture are modified with respect to filling according to a triangular or hexagonal mesh. The design repair must therefore be done at the level of the granularity, since the inter-beam distances of the spots for equilateral or isosceles triangular mesh (arising from the square) are not the same. Thus a first parameter to be modified is the optimal size of the reflector, the choice of which is made with respect to a point of performance in the worst case (which turns out to be a double point and not a triple point); the roll-off is therefore chosen in this sense and thus leads to the most appropriate diameter. Subsequently, the choice of the ratio F/D (Focal length/Diameter) is made while taking account of objectives of performance in off-boresight mode and also of C/I values required. In the example of FIG. 3c, it is apparent that it is possible to cover the territory of metropolitan France with a first grid of 17 beams and a second grid of 15 beams while complying with a granularity of the beams at 0.25°.

Figure 5:
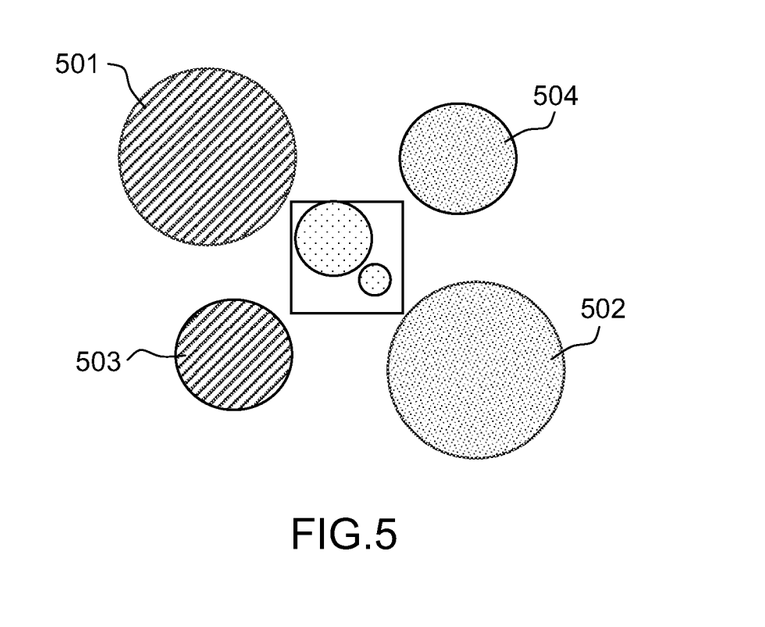
FIG. 5, a diagram representing a first embodiment of an antenna system according to the invention.

The use of a double grid with square mesh comprises notably the advantage that it offers the possibility of implementing sources of square shape for example square pyramidal horns, as illustrated in FIG. 5. Associated with the square mesh of the beams, these sources lead to better effectiveness of sampling of the territory to be covered; they make it possible to obtain a directivity gain of ratio $4/\pi$ in the case of a square by comparison with the use of round or circular horns in the case of a triangular or hexagonal mesh. Furthermore, the double grid makes it possible to obtain improved performance in the worst case regarding coverage since the weakest point in directivity is a point of intersection between two square mesh beams and not between three beams in the case of a conventional hexagonal or triangular mesh. The gain in directivity is related to the weakest roll-off on the basis of the maximum directivity of the beam.

Figure 4A:
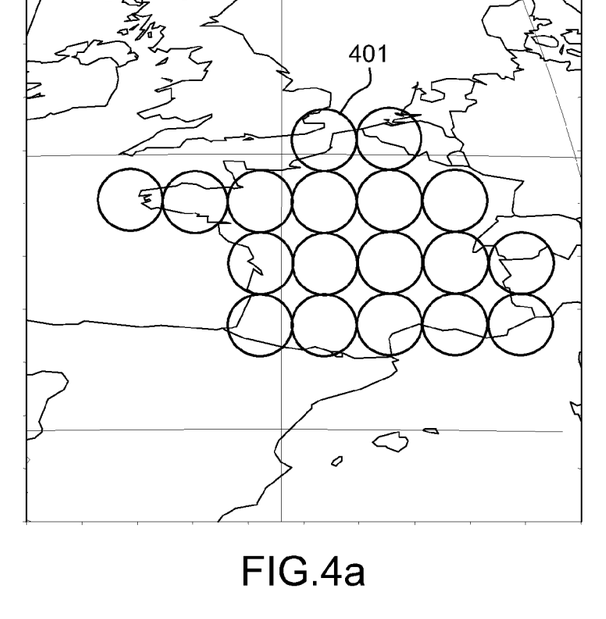
FIG. 4a, a second example of a first grid of spots obtained with the system according to the invention.

FIG. 4a presents a second example of a first grid of spots obtained with the system according to the invention. The first grid of spots comprises a set of adjacent spots 401 aligned along two orthogonal axes, similarly to FIG. 3a.

Figure 4B:
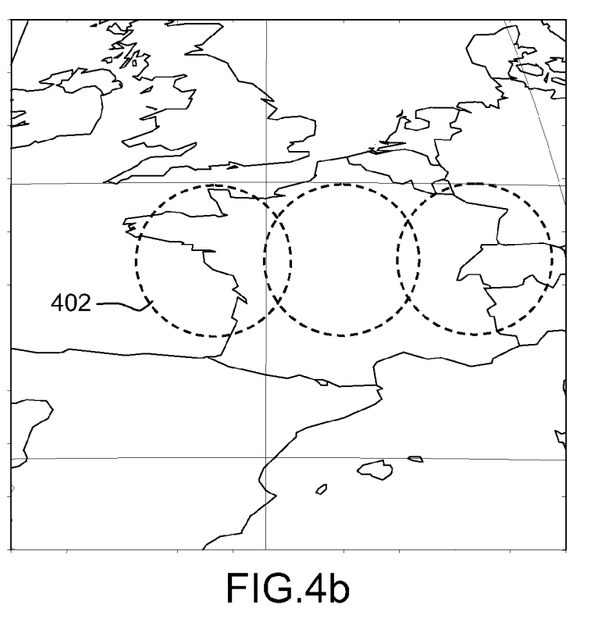

FIG. 4b presents a second example of a second grid of spots complementary to the first grid represented in FIG. 4a. The spots 402 of the second grid are represented by dashes in FIG. 4b. In contradistinction to the first example, the spots have a different dimension from that of the spots of the first grid of FIG. 4a.

Figure 4C:
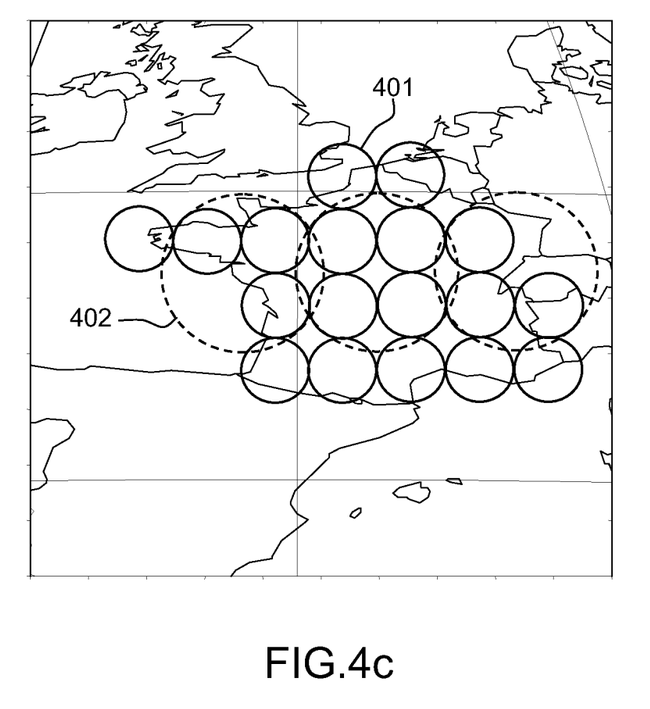
FIG. 4c, a second example of a double grid of system spots according to the invention, obtained by combining the first grid of FIG. 4a and the second grid of FIG. 4b.

FIG. 4c presents a second example of a double grid of system spots according to the invention, obtained by combining the first grid of FIG. 4a and the second grid of FIG. 4b.

The coverage of the territory with the aid of two nested and shifted square mesh grids, may be generated by using an antenna for each of the two grids. Two architectures adapted to the generation of such a double grid for systems ensuring the reception and the transmission of signals are then notably distinguished:

a first architecture with four antennas, in which a first antenna operating in reception generates the first grid of spots, a second antenna operating in reception generates the second grid of spots, a third antenna, operating in transmission, and generating the first grid of spots, and a fourth transmit antenna generating the second grid of spots;

a second architecture, in which two antennas each operate in transmission and in reception, a first antenna generating a first grid, the second antenna generating the second grid.

The results show that these architectures are advantageous in relation to the conventional architectures, both in terms of radiofrequency performance and of bulk.

FIG. 5 illustrates with a diagram, a first embodiment of an antenna system according to the invention implementing the first aforementioned architecture. The deployed reflectors of the system are represented in a schematic manner by discs, the central square representing the Earth face of the satellite and the two circles on this earth face, marking the location of the antennas of the contribution link ensuring the connections to the traffic stations of the ground communication service.

Two antennas, preferably in spillover mode, are required in order to generate a complete grid of spots. Each pair of antennas is adapted and dimensioned in its frequency band. In the example, the two antennas dedicated to the transmit mode are provided with a reflector 501, 502 with a diameter of 3900 mm, and the two antennas operating in reception each have a reflector 503, 504 whose dimensions are chosen proportionately to the frequency ratios (in the example, this ratio is equal to 20 GHz/30 GHz, hence a reflector with a diameter of 2600 mm for operation at 30 GHz).

The spots are identical and superimposed in transmit and receive mode. This architecture, in contradistinction to the conventional configuration with four antennas in mixed RX/TX mode, does not suffer from the effects of the truncations of the reflectors, since the biggest are stored, either on the satellite side as close as possible to the shell, or in Earth face mode. The reflectors, which in the example are smaller for the receive mode (at 30 GHz), are stored on the sides of the satellite, either alone, or in the second row behind the reflectors of the transmit mode (at 20 GHz).

In the prior art system, the four antennas were provided with reflectors whose dimensions were substantially identical and resulted in each case from the compromises between the RX mode and the TX mode. In the system according to the invention, the pair of antennas making it possible to generate the double grid in reception is smaller than the pair of antennas used for transmission. Hence, this hardware configuration which results directly from the use of the double grid with square mesh makes it possible to mitigate the setup problems encountered in the prior art by avoiding the truncations of the reflectors.

The first architecture comprises notably the following advantages:

a dimensioning in the sole reception or transmission frequency band, thereby avoiding the compromises of parametrization of the antenna system as in the conventional case of the mixed RX/TX mode; stated otherwise, each of the two source blocks, in reception or in transmission, is dimensioned in its sole frequency band and need not be designed to effect a compromise over 150% of bandwidth;

a simplification of the architecture of sources whose design is limited to the radiofrequency port, the polarizer (if necessary) and the radiating element; the source blocks are less complex on account of the disappearance of the frequency separators, required in the conventional architecture;

the separation of the transmission and reception blocks also simplifies the problematic issue related to the power handling, notably the problems of PIMPs (Passive Inter-Modulation Products);

perfect superposition of the transmission related spots (corresponding to the notion of congruence) and of the reception related spots, when the design parameters of the antenna system are chosen in a frequency-homothetic manner (that is to say in a ratio 2/3 in the case of transmission at 20 GHz and reception at 30 GHz), thus avoiding the problems related to ellipse-shaped coverages and encountered in the conventional architecture;

moreover, the minimum performance zones are situated at the level of the junctions of the spots which are on double and not triple points, thus offering further flexibility as regards the roll-off parameter, therefore as regards the design of the primary sources, thereby affording better homogeneity of the levels of directivity as regards coverage. This flexibility enables increased directivity as regards coverage and eases the installation of very high-throughput capacitive systems;

the possibility of using square horns as samplers in the focal arrays which allow a directivity gain of 10*log(4/pi) and also latitude in adjustments which may not be envisaged with the hexagonal mesh: possibility of local slippages of sources so as to optimize the spots in relation to the service coverage; stated otherwise, a source may be slightly shifted with respect to the initial alignment, so as to cover an off-centred zone.

By way of example, a satisfactory configuration is obtained by choosing the following parameters: a granularity of the beams at 0.25° over metropolitan France, a spillover mode in the vicinity of −3 dB, a reflector size substantially equal to 3.9 m for the 20 GHz band leading to a roll-off at the double point of about −4 dB, and a directivity in the worst case (that is to say at the level of the junctions of the spots) of about 52 dBi for coverage of metropolitan France and Corsica with the aid of 32 beams.

In the aforementioned example, the first architecture makes it possible to obtain identical performance in terms of directivity to that which is obtained with the conventional configuration with four antennas in mixed mode without the effects of truncations—and superior by nearly 1 dB to the performance obtained with allowance for truncations in the conventional configuration, —, while benefiting from the abovementioned simplifications as well as easier setup on a satellite. Improved setup opens up possibilities for increasing the diameters of the reflectors so as to maximize the capacity of the satellite, either by raising the number of smaller beams, or by improving the directivity performance. For example, reflectors with a diameter of 3500 to 3900 mm may be envisaged for transmission and reflectors with a diameter of 2100 to 2600 mm may be envisaged for the reception function.

Figure 6:
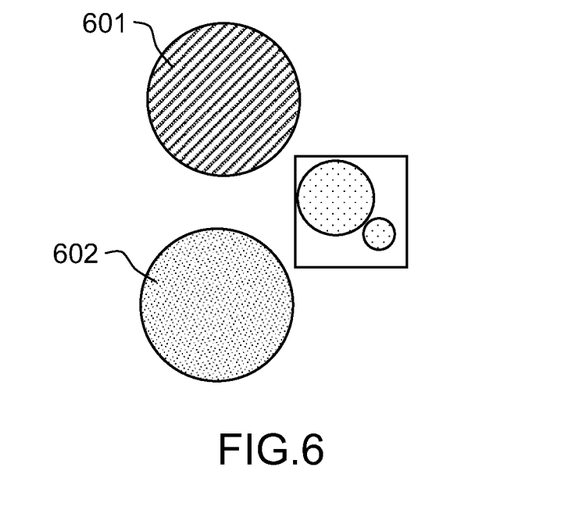
FIG. 6, a diagram representing a second embodiment of an antenna system according to the invention.

FIG. 6 illustrates with a diagram, a second embodiment of an antenna system according to the invention implementing the second aforementioned architecture. This second architecture implements only two antennas, each in mixed RX/TX mode. The reflectors 601, 602 of these two antennas are represented in the figure by discs.

The parameters are chosen according to the same type of constraints as for the conventional architecture with four RX/TX antennas, namely to favour the transmit mode or the receive mode, maintain the roll-off levels, maintain the C/I and off-boresight levels. But a great advantage afforded by this second architecture is the ability to propose a system comprising only two antennas with a low loss of directivity with respect to the prior art configuration with four antennas in mixed RX/TX mode. On account of the compromise to be made between the transmit mode and the receive mode, we will have two different modes of operation between transmission, at the lowest frequency which is organized according to a spillover mode and reception which will be effected according to a "Gaussian" mode, that is to say close to the optimal theoretical illumination. The pure spillover mode in separate RX and TX mode (that is to say a source block generates the whole of the grid of the beams) leads to a discrepancy of performance of about three isotropic decibels in terms of directivity with respect to the first aforementioned architecture of the type with four antennas in RX/TX mode. Generating the coverage with the aid of two nested grids makes it possible to compensate at least in part for the loss of directivity due to the spillover mode, on the one hand because of the management of the roll-offs on the square mesh, on the other hand because the worst case point is a double and not a triple or quadruple point.

Moreover, according to this second architecture, the reflectors may be identical and there are only two source blocks. The mission of wide multispot type can thus be set up on just one side of a satellite in double deployment mode for the reflectors (on the side or Earth face), thus leaving the other part of the satellite free for another mission in the Ku-band, in the C-band, or in the S-band, for example.

Thus, this second architecture may be advantageous, for example for communications operators desiring to offer high-throughput services at lesser cost or for operators desiring multi-mission satellites, by virtue of the space freed by the two antennas at least. By way of example, a satisfactory configuration in two Rx/Tx antenna mode is obtained by choosing the following parameters: a granularity of the beams at 0.235° over metropolitan France, a spillover mode in the vicinity of −3.4 dB in transmission, a Gaussian mode in the vicinity of −8 dB in reception, a reflector size substantially equal to 3.9 m leading to a roll-off at the double points of about −3 dB, and a directivity in the worst case (that is to say at the level of the junctions of the spots) of about 52 dBi for coverage of metropolitan France including Corsica with the aid of 36 beams at 20 GHz, this same reflector leading to a roll-off at the double point of about −6 dB and a directivity in the worst case of about 54 dBi, still for a coverage comprising metropolitan France (including Corsica) by 36 beams.

Advantageously, in the case where the antennas each comprise an array of radiating elements that are able to receive and/or to transmit radioelectric signals and where each antenna is placed facing a reflector, a beam being produced by a single radiating element, for a given reflector size, the size of the radiating elements of the antennas is chosen less than the optimal size leading to maximum efficiency of the antenna, the said size being chosen so that the losses of energy by spillover of the reflector are greater than those obtained with the said optimal size, the system comprising at least two adjacent radiating elements, the said size of the elements being chosen so that a first radiating element, adjacent to a second radiating element of the array of radiating elements, can generate a spot adjacent to the spot generated by the second radiating element.

The reduction in diameter effected between a configuration of antennas with spillover and a conventional dimensioning is by a factor substantially equal to two. A conventional source affords an illumination on the edges of the reflector of about −12 dB with respect to the point of the reflector illuminated to the maximum, while the source of restricted size according to this technique gives an illumination in the neighbourhood of −3 dB with respect to the point of the reflector illuminated to the maximum. The reflectors of the antenna system according to the invention can thus be illuminated on its edges to levels lying preferably between −2 and −4 dB with respect to the maximum level of illumination of the reflector.

This technique is called "spillover", since the choice of smaller sources than the conventional sizes leads to bigger losses by spillover and antennas with efficiencies of less than 50%, which seems, a priori, to be a strange choice. However, this choice, leading to higher losses by spillover, makes it possible to design an antenna system with a continuity of spots over the zone to be covered while having a restricted number of antennas. The sacrifice of antenna efficiency thus makes it possible to reduce the size of the radioelectric sources so as to shrink the beams in order to be able to fill a grid of spots with a single antenna.

Also, the system according to the invention can implement this spillover technique to generate each of the grids of the double grid with square meshes. The combination of the complementary techniques namely, on the one hand, coverage by a square meshed double grid, and on the other hand, the spillover technique makes it possible to produce antenna systems whose performance is at least as good as that obtained with a conventional architecture. Indeed, the spillover technique makes it possible to more readily generate a grid comprising adjacent spots, and the technical advantages obtained by virtue of the use of a double grid compensate for the loss of efficiency due to spillover, these technical advantages being notably:

worst case point directivity located on a double point of interspots;
  satisfactory C/I value on account of the increase in the distances related to the mesh;
  enhanced directivity through the possibility of carriage of square sources generating spots according to a square mesh: aptness of the samplers to their position in the focal plane and better filling of the energy capture area.

Moreover, it should be noted that double-grid operation allows greater flexibility in the management of the parameters of the antenna system. It offers notably some latitude as regards the size of the sources and their separation, and also as regards the management of the spillover mode, as a function of the roll-off on a double point which is less critical than a triple point in terms of pattern slope and fast variations.

According to another embodiment, the first grid is generated with the aid of a first antenna installed on a first satellite, the second grid being generated by an antenna installed on a second satellite, the two satellites complementing one another so as to cover a given geographical zone.

According to another embodiment, the antenna system operates solely in reception or solely in transmission. In this case, an architecture with two antennas may be employed, a first antenna generating the first grid solely in transmission or solely in reception, the second antenna generating the second grid solely in transmission or solely in reception.

Figure 7:
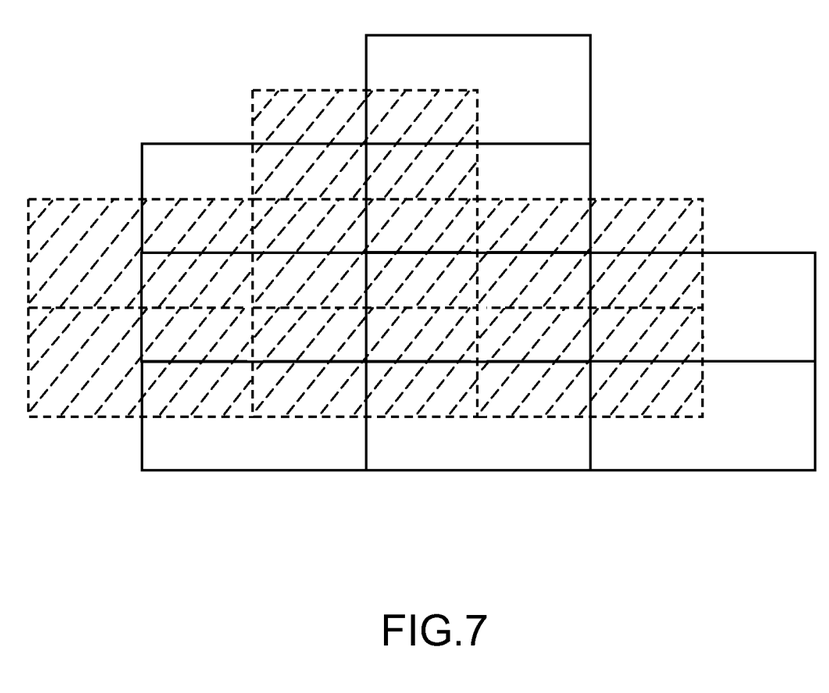
FIG. 7, a diagram representing a double grid of sources with rectangular mesh, one of the two grids being shifted with respect to the other grid by a half-distance of spots along the two orthogonal axes.
Figure 8:
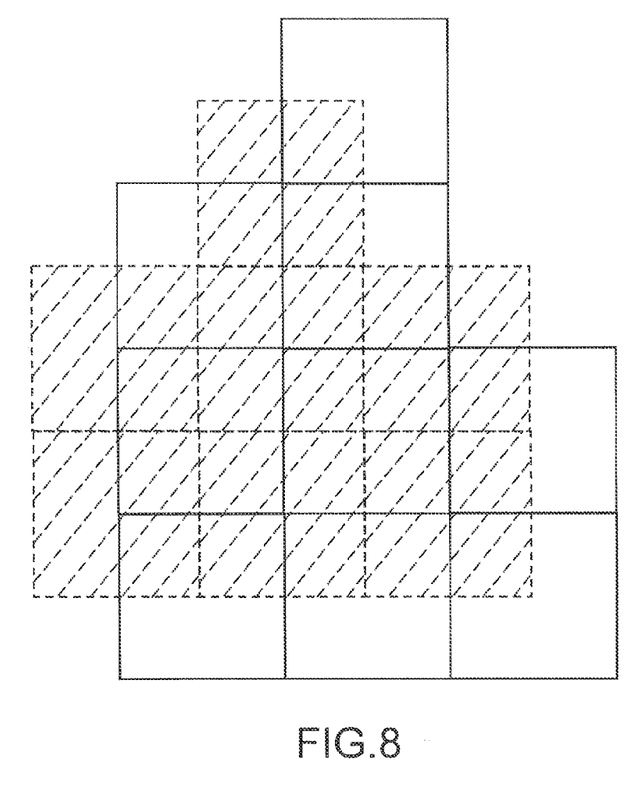
FIG. 8, a diagram representing a double grid of sources with square mesh, one of the two grids being shifted with respect to the other grid by a half-distance of spots along the two orthogonal axes.

As illustrated in the diagrams of FIGS. 7 and 8, a source of rectangular shape (FIG. 7) or of square shape (FIG. 8) may be used to optimize the sampling of the territory to be covered. In the figure, the sources associated with a first grid are represented by solid lines, while the sources of the second grid are represented by dashes.

Figure 9:
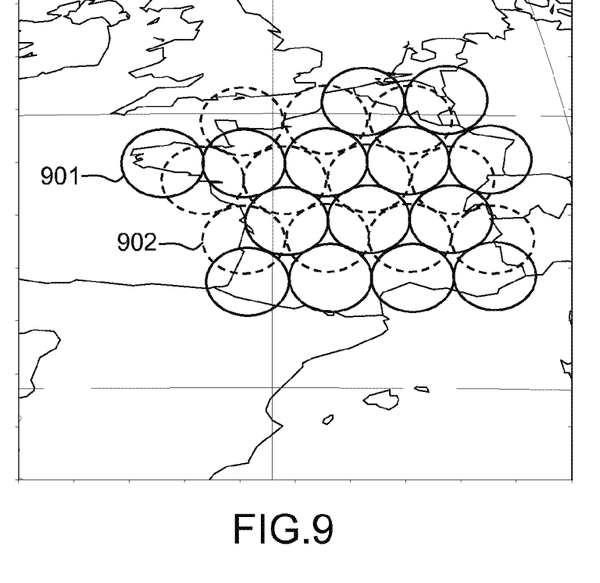
FIG. 9, a diagram representing a first example of a double grid of sources with triangular mesh.
Figure 10:
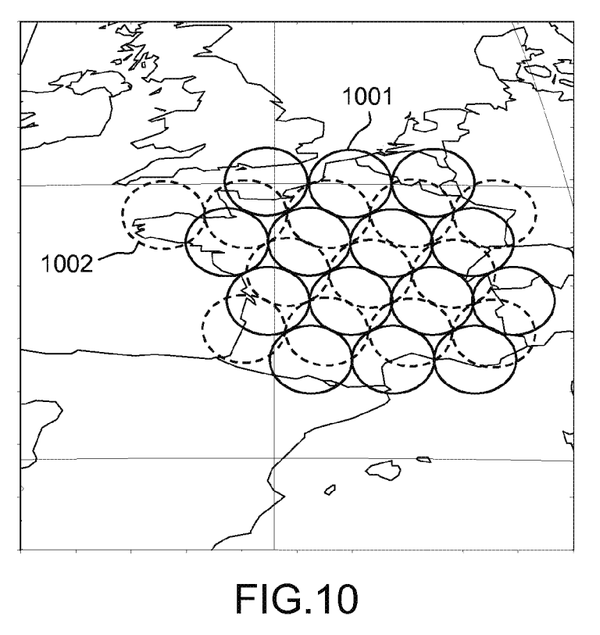
FIG. 10, a diagram representing a second example of a double grid of sources with triangular mesh.

FIGS. 9 and 10 represent examples of a double grid of sources with triangular mesh. According to a first example illustrated in FIG. 9, the spots 902 of the second grid, represented by dashes, are positioned on triple points of the first grid, that is to say each of their centres is placed at the centre of an equilateral triangle connecting three centres of spots 901, represented by solid lines, of the first grid. According to a second example illustrated in FIG. 10, the spots 1002 of the second grid are positioned on double points of the first grid; stated otherwise, the spot centres 1002 of the second grid are positioned in the middle of the segment connecting two centres of spots 1001 of the first grid.

An advantage of the antenna architecture according to the invention is that it allows the gradual introduction of a satellite-based data broadcasting service, with the bringing into operation of a first antenna mounted on a first satellite, followed subsequently, by the bringing into operation of a second antenna mounted on a second satellite. The implementation of the first antenna already makes it possible to cover the territory while avoiding totally uncovered zones.

A first antenna on a first satellite offering, for example, square meshing can commence a service over a geographical zone. The precise positioning of the square mesh can already aim at the coverage of a certain number of towns or zones over the said territory. Thus a satellite operator can at lesser cost commence the deployment of a new broadcasting service. As a function of its market penetration, it is then able to supplement the complete grid by utilizing a second antenna on a second satellite which ensures the supplement as regards the zone of services. Numerous approaches of supplements are conceivable at this level on account also of the fact that it is possible to nest meshes of different sizes. By way of example, a certain service may be offered with a first antenna while exhibiting holes at the quadruple points. A second antenna of lesser size (therefore offering lesser throughputs) may however be proposed so as to "plug" the holes of the previous grid and thus cover the complete zone. Of course, the addition of a second antenna identical to the first antenna on a second satellite also allows this function to be fulfilled, for identical performance.

Other advantages of the antenna system according to the invention are, inter alia: easier setup of the satellite, the absence of truncation of the reflectors in the case of lateral storage of the antennas, the capacity to use very large reflector diameters, the possibility of using highly effective sources adapted to their mesh such as square horns in the case of the square mesh. This therefore yields the most efficacious and relevant sampling in the focal plane of the energy focused by the reflector.

The invention claimed is:

1. A multi-beam antenna system for covering a geographical zone decomposed into a plurality of spots, the system comprising:
two antennas for reception and/or for transmission, wherein the antennas are configured so as to cover said zone with two grids of spots,
each antenna comprising a plurality of radiating elements each producing a spot, the radiating elements being arranged so that several spots of the first grid, that are generated by a first antenna, are aligned along two substantially orthogonal axes, so that points exist that are situated substantially equidistantly from the centres of four adjacent spots, several spots of the second grid, that are generated by the second antenna, being centred on said points.

2. The multi-beam antenna system according to claim 1, in which the spots of the first grid are substantially the same dimension as the spots of the second grid.

3. The multi-beam antenna system according to claim 1, in which the spots of the second grid have a radius at least equal to twice the radius of the spots of the first grid.

4. The multi-beam antenna system according to claim 1, in which several spots of the first grid, that are generated by the first antenna, are aligned along two non-orthogonal axes, so that there exist adjacent spots whose centres form a parallelogram, several spots of the second grid, that are generated by a second antenna, being centred on the centres of said parallelograms.

5. The multi-beam antenna system according to claim 4, in which the parallelograms are lozenges.

6. The multi-beam antenna system according to claim 1, wherein at least one antenna is dimensioned so that a beam is produced by a single radiating element, and for a given reflector size, the size of the radiating elements is chosen less than the optimal size leading to maximum efficiency of the antenna, said size being chosen so that the losses of energy by spillover of the reflector are greater than those obtained with said optimal size, the system comprising at least two adjacent radiating elements, said size of the element being chosen so that a first radiating element, adjacent to a second radiating element of said array, can generate a spot adjacent to the spot generated by the second radiating element.

7. The multi-beam antenna system according to claim 6, wherein the size of the radiating elements is such that the level of illumination on the edges of the reflector is in a ratio lying between −2 dB and −4 dB with respect to the maximum illumination level obtained on the reflector.

8. The multi-beam antenna system according to claim 1, further comprising two pairs of antennas, the antennas of the said first pair being able to operate in reception only and the antennas of second pair being able to operate in transmission only, the first antenna of each pair being configured so as to cover the geographical zone according to the first grid of spots, the second antenna of each pair being configured so as to cover said geographical zone according to the second grid of spots.

9. The multi-beam antenna system according to claim 8, wherein the antennas of the first pair are adapted for operating in a first frequency band, the antennas of the second pair being adapted for operating in a second frequency band distinct from the first band, the reflectors and the radiating elements of the antennas of the second pair being dimensioned substantially in proportion to the frequency ratio of the first frequency band to the second frequency band, in such a way that, for each of the grids of spots, the spots generated by the first antenna are substantially superimposed on those generated by the second antenna.

10. The multi-beam antenna system according to claim 1, further comprising two antennas each able to operate in reception and in transmission, the first antenna being configured so as to cover the geographical zone according to the first grid of spots, the second antenna being configured so as to cover the geographical zone according to the second grid of spots.

11. The multi-beam antenna system according to claim 1, wherein the aperture of the radiating elements of at least one antenna is of square shape, said radiating elements being aligned and placed so that their edges are parallel to one another.

12. The satellite comprising an antenna system according to claim 1.

13. The satellite communication system comprising at least two distinct satellites, the first satellite comprising the first antenna of an antenna system according to claim 1, a second satellite comprising the second antenna of said antenna system.

* * * * *